UNITED STATES PATENT OFFICE.

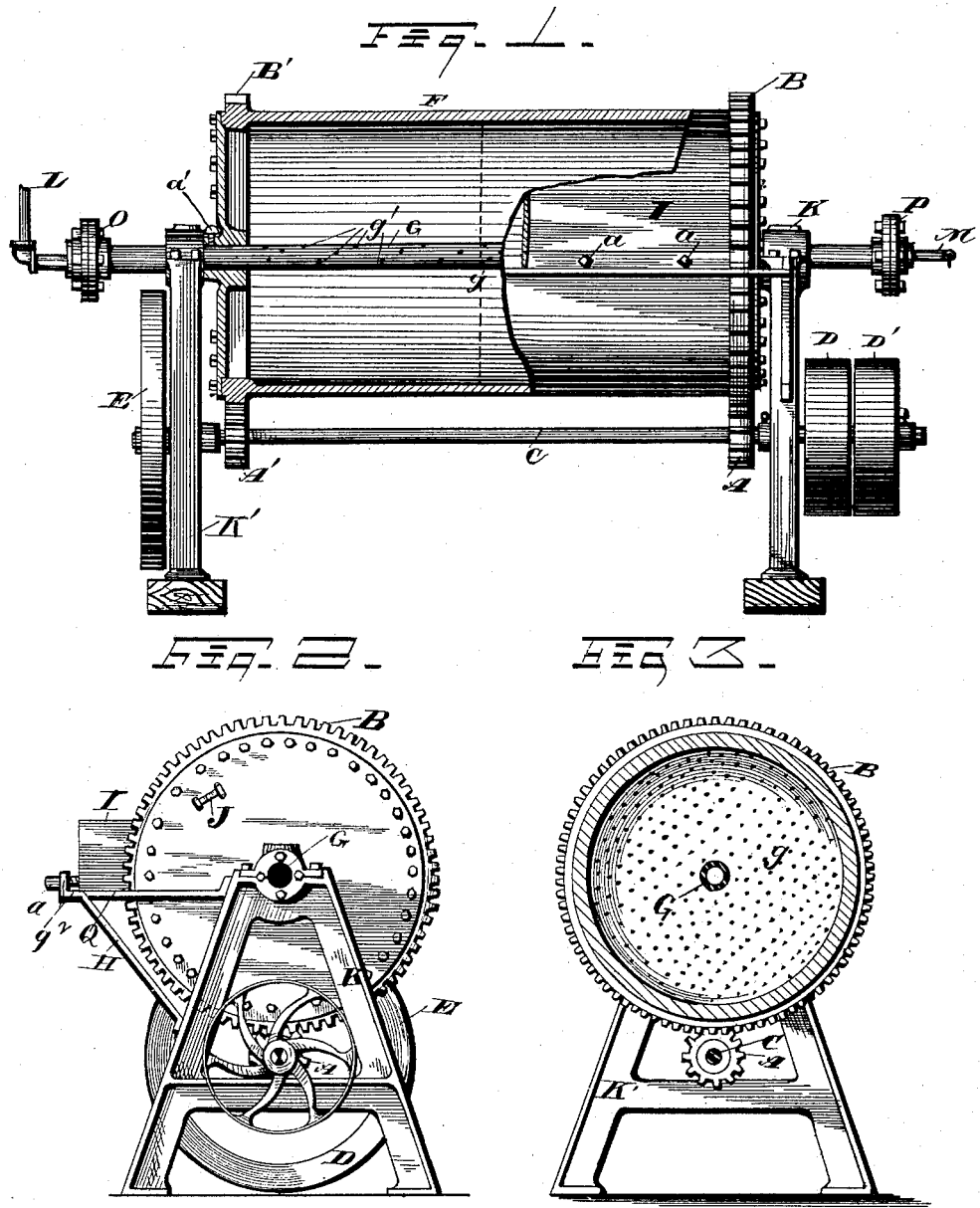

WILLIAM ASHER, OF CLEVELAND, OHIO.

PARAFFINE-OIL FREEZING-MACHINE.

SPECIFICATION forming part of Letters Patent No. 327,985, dated October 13, 1885.

Application filed January 2, 1885. Serial No. 151,729. (No model.)

*To all whom it may concern:*

Be it known that I, WILLIAM ASHER, of Cleveland, county of Cuyahoga and State of Ohio, have invented certain new and useful Improvements in Paraffine-Oil Freezing-Machines; and I do hereby declare the following to be a full and exact description of my invention, such as will enable others skilled in the art to which it pertains to make and use the same.

My invention relates to improvements in paraffine-oil freezing-machines, the object in view being to provide a freezing-drum for receiving upon its outer surface the oil supplied with brine or other freezing mixture at a low degree of temperature, by means of an internal axially-located and perforated pipe upon which the drum revolves independent of motion in the pipe.

My invention also relates to improvements in the receiving or scraping trough for the chilled oil, for making the distance between the trough and revolving surface of the drum adjustable, by means of set-screws, so as to bear at will upon the revolving surface of the drum.

My improvements also relate to supplying an iron frame to support all the parts, as shown in the accompanying drawings.

The operation of the machine is as follows: The drum or cylinder F being cooled by the freezing liquid circulating through the pipe G and interior of the drum F, the oil is allowed to fall upon the upper surface of the drum F, forming instantly a thick coating of wax, which is received and scraped off by the scraping-trough at I.

Heretofore drums constructed for this purpose have been rigidly attached to the tube supplying them with the freezing mixture by set-screws or otherwise, so as to be immovable upon the tube, which, being used as a shaft, conveyed motion to the drum. Great disadvantage accrued from this construction, all the parts being rigidly connected, any interference in the movement of the drum F, on account of the solidifying of the freezing mixture or otherwise, causing a breakage of the pipe or adjacent parts, thereby delaying the operation of the machine for many hours, and involving much expense. In my invention these difficulties are avoided by means of a second shaft conveying the motion by means of gears to the drum, which is attached, as before, to the internal pipe by set-screws, to give movement enough to the pipe to prevent freezing of the mixture circulating in it, but not tight enough to retain hold of the screws in case of clogging or obstruction to the drum by any of the means before mentioned. With these ends in view, my improvement consists in certain features of construction and combination of parts as will hereinafter be described, and pointed out in the claims.

In the accompanying drawings, Figure 1 is a view, in part vertical section and part elevation, of my improvements in paraffine-oil freezing-machines. Fig. 2 is an end elevation of the same; and Fig. 3 is a transverse section through the line $x\,x$, showing the perforated screen which separates the drum into two portions or compartments.

A and A' are face gears, revolved by means of the fixed pulley D upon the shaft C, these gears conveying motion to the corresponding gears, B and B', upon the drum F, which is thereby made to revolve.

The other parts represented are as follows: G is the hollow shaft or tube supported upon the frames K and K', and made to revolve with the drum by means of the set-screws $a'$ at either end of the drum. This shaft is perforated with the holes $g'$ for the entrance and escape of the freezing mixture. These set-screws are not strong enough to retain the shaft in case of obstruction to the movement of the drum or to the shaft. This perforated central tube or shaft is supplied with the freezing mixture by means of pipe M entering the stuffing-box at P, and the freezing mixture flows out of the drum through the perforated tube, and escapes through the pipe L, which is connected with the stuffing-box at O.

I represents the trough or scraper resting upon the support Q, made of iron, and attached to the supporting-frames K and K' by means of the braces H and H', and extending across the entire front of the drum or cylinder. All parts of the frames are preferably made of the same material as the supports, thus giving lightness and rigidity in construction. This support Q has the flange $g^2$ projecting from the back, to which are attached the set-screws *a a*, for adjusting the position of the scraper or trough with reference to the drum. The thermometer J may also be attached, if desired.

A fly-wheel, E, is secured at one end of the shaft *c*, to give a steady and uniform motion to said shaft.

Thus, having described my invention in full, what I claim as new and useful, and desire to secure by Letters Patent, is—

1. In a paraffine-oil freezing-machine, the combination, with the hollow perforated shaft for supplying freezing mixture and supports for said shaft, of the drum having gearing, substantially as described, said drum being secured to said shaft by means of set-screws in such manner that if the movement of the shaft is obstructed the drum is turned without the shaft, and gears A A′ engaging the gears B B′, substantially as set forth.

2. The combination, with the geared drum, the pipe for supplying the freezing mixture, and its supports, of the shaft *c*, and gears A A′ on said shaft for rotating the geared drum, and the fly-wheel E on said shaft *c*, substantially as set forth.

3. In a paraffine-oil freezing-machine, the combination, with the drum or cylinder, and the tubular perforated shaft therefor, of the central partition or screen in said cylinder, substantially as set forth.

In testimony whereof I sign this specification in the presence of two witnesses, this 27th day of December, 1884.

WILLIAM ASHER.

Witnesses:
A. W. LAMSON,
A. J. MICHAEL.